United States Patent [19]

Scott, IV et al.

[11] 4,261,964
[45] Apr. 14, 1981

[54] UTILIZATION OF COMBUSTIBLE COMPONENTS OF A TAIL-GAS IN THE MANUFACTURE OF CARBON BLACK AT A HIGH PRODUCTION RATE

[75] Inventors: Oscar T. Scott, IV; Donald J. Pundt; Lloyd D. Price, all of Borger, Tex.

[73] Assignee: J. M. Huber Corporation, Locust, N.J.

[21] Appl. No.: 58,221

[22] Filed: Jul. 16, 1979

Related U.S. Application Data

[63] Continuation-in-part of Ser. No. 792,362, Apr. 29, 1977, abandoned.

[51] Int. Cl.$^3$ .......................... C01B 31/02; C09C 1/48
[52] U.S. Cl. ........................................ 423/450; 423/449
[58] Field of Search ........................ 423/449, 450, 456

[56] References Cited

U.S. PATENT DOCUMENTS

| | | | |
|---|---|---|---|
| 2,672,402 | 3/1954 | Stokes | 423/220 |
| 2,796,332 | 6/1957 | Pollock | 423/450 |
| 3,438,732 | 4/1969 | Morel | 423/450 |
| 3,592,865 | 7/1971 | Long et al. | 585/835 |
| 3,651,159 | 3/1972 | Long et al. | 585/848 |
| 3,725,103 | 4/1973 | Jordan et al. | 106/307 |

*Primary Examiner*—O. R. Vertiz
*Assistant Examiner*—Gregory A. Heller

*Attorney, Agent, or Firm*—Ernest A. Schaal; Harold H. Flanders

[57] ABSTRACT

The present invention provides an effective means of increasing the production rate of a carbon black process. A hydrocarbon fuel is burned in an insufficient amount of air to support complete combustion to produce a hot gas mixture which produces a tail-gas containing carbon black by the incomplete combustion of a hydrocarbon feedstock. This tail-gas is quenched, the carbon black is removed, and the tail-gas is dried. One or more of the combustible components are removed from the dried tail-gas and from 33 $\frac{1}{3}$% to 100% of the fuel is replaced with the combustible components so removed.

One method of removing carbon monoxide is by contacting the tail-gas with a liquid sorbent comprising cuprous aluminum halide; complexing substantially all of the carbon monoxide contained in the tail-gas; removing the complexed carbon monoxide from the tail-gas; contacting the complexed carbon monoxide with a stripping ligand that forms a more stable complex with sorbents than carbon monoxide, thereby exchanging the stripping ligand for carbon monoxide and recovering the carbon monoxide and a cuprous aluminum halide-stripping ligand containing complex. The contacting steps conducted under substantially anhydrous conditions in the substantial absence of oxygen.

12 Claims, 2 Drawing Figures

UTILIZATION OF COMBUSTIBLE COMPONENTS OF A TAIL-GAS IN THE MANUFACTURE OF CARBON BLACK AT A HIGH PRODUCTION RATE

CROSS REFERENCE TO RELATED APPLICATION

This application is a continuation-in-part of copending U.S. Application Ser. No. 792,362 filed Apr. 29, 1977, now abandoned.

BACKGROUND OF THE INVENTION

1. Field of the Invention:

In general, the present invention relates to the production of carbon black and more specially to the use of the combustible components of tail-gas as a fuel for cracking hydrocarbons into carbon black at a high production rate.

2. Description of the Prior Art:

One way of making carbon black is to burn natural gas to form hot gases, then contact hydrocarbons with these hot gases to crack the hydrocarbons into carbon black with tail-gas as a by-product. The tail-gas has combustible components (e.g. carbon monoxide and hydrogen), and non-combustible components (e.g. nitrogen, carbon dioxide and water). In one process, carbon black is separated from the tail-gas and part of the tail-gas is used to heat boilers or dryers. The rest of the tail-gas is vented to the atmosphere.

As the supply of natural gas becomes depleted and its cost increases, it becomes important to find a way of producing carbon black in a cheaper, more energy efficient method than the prior art process.

PRIOR ART PATENTS

British Pat. No. 963,526 describes the concept of using tail-gas having a low calorie content as a partial replacement of natural gas. The tail-gas is separated from the carbon black, washed, filtered and enriched with a liquid hydrocarbon. The presence of nitrogen, water and carbon dioxide in the tail-gas causes the tail-gas BTU content to be low. Thus, the tail-gas must be enriched with from 20 to 100 kg of liquid hydrocarbons for each 100 cu m of purified exhaust gas to support the reaction.

Canadian Pat. No. 779,854 teaches increasing the yield of a carbon black process by the injection of a carbon dioxide containing gas. One method of supplying this carbon dioxide to the reaction is by recycling the tail-gas with the carbon black removed. The only element that is removed from the tail-gas is carbon black, so the heat content of the fuel gas is not sufficient to support the reaction. Additional fuel gases are needed to support the reaction.

U.S. Pat. No. 2,564,736 describes recycling part of the tail-gas produced in a carbon black process to replace part of the natural gas used as fuel. Pure oxygen is used instead of air to burn the natural gas. The tail-gas that is recycled is stripped of carbon black and water, but the carbon dioxide remains in the tail-gas and is recycled. Because of the presence of carbon dioxide in the recycled tail-gas, only part of the natural gas can be replaced with tail-gas. This patent discusses stripping carbon dioxide from the tail-gas, but once this tail-gas is stripped, it is not recycled back to the reaction; instead, it is used as a Fischer Tropsch Synthesis gas.

U.S. Pat. No. 2,672,402 is similar to U.S. Pat. No. 2,564,736 except that liquid hydrocarbons are used as fuel instead of natural gas. Neither patent teaches using air instead of pure oxygen. In both patents, part of the fuel is replaced with tail-gas that has been stripped of carbon black and water. In both patents, the tail-gas that is recycled still contains carbon dioxide. Because of the presence of carbon dioxide in the recycled tail-gas, only part of the liquid hydrocarbon can be replaced with the tail-gas.

In British Pat. No. 925,914, part of the tail-gas is recycled to the reactor to provide seeds for easier formation of carbon black. Nothing is removed from the tail-gas prior to the tail-gas being recycled. Since the tail-gas contains non-combustibles like nitrogen and carbon dioxide, fuel gas has to be added to maintain the reaction.

U.S. Pat. No. 3,438,732 teaches removing the water vapor and combustible components from tail-gas to provide an inert tail-gas. This inert tail-gas is recycled to the reactor with air and a combustible gas to dilute the gas in the reactor. This dilution causes the carbon black particle size to be smaller. Since the combustible components are removed from the tail-gas prior to being recycled, the tail-gas does not replace any of the natural gas.

In all of the above prior art, either all components of the tail-gas, the tail-gas minus carbon black, or the non-combustible components of the tail-gas have been recycled. In none of the above prior art has nitrogen or carbon dioxide been removed from the tail-gas being recycled. In none of the above prior art has the BTU content of the tail-gas been sufficient to support the reaction by itself.

In U.S. Pat. No. 1,811,854, free hydrogen gas is added to a channel black process to increase the yield of carbon black. The hydrogen that is supplied does not come from the tail-gas, nor is it used to replace the fuel requirements of the process.

In U.S. Pat. No. 3,725,103, hydrogen and carbon monoxide are cited as possible fuels. The hydrogen and carbon monoxide are not supplied from the tail-gas, and the use of hydrocarbons was preferred over the use of hydrogen or carbon monoxide as fuels.

BRIEF DESCRIPTION OF THE DRAWINGS

In order to facilitate the understanding of this invention, reference will now be made to the appended drawings. The drawings should not be construed as limiting the invention but are exemplary only.

SUMMARY OF THE INVENTION

Figure 1:
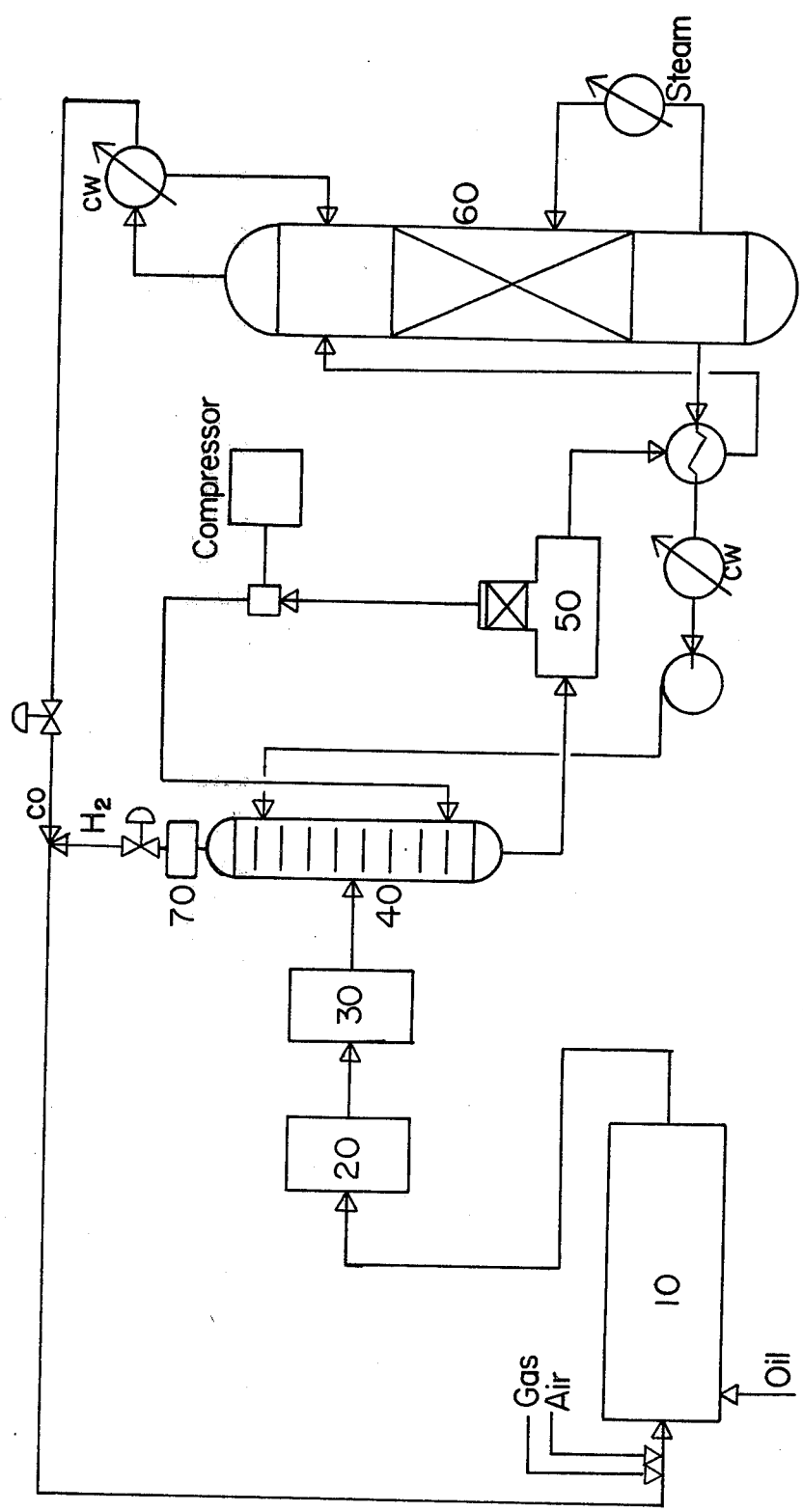
FIG. 1 shows a diagramatic illustration of a suitable arrangement of apparatus for carrying out a particularly advantageous method embodiment of the invention.

Accordingly, it is an object of this invention to provide a new and highly effective process which overcomes the deficiencies of the prior art as described above.

One object of the present invention is to increase the production rate of the carbon black process.

Another object of the present invention is to increase the yield of the carbon black process.

A further object is to develop a more energy efficient carbon black process.

Still another object is to reduce the amount of natural gas and other valuable fuels needed to sustain the carbon black process.

Other objects and a fuller understanding of this invention may be had by referring to the following description and claims.

The present invention overcomes the deficiencies of the prior art and achieves its objectives by burning air and a hydrocarbon fuel to produce a hot gas mixture; producing a tail-gas containing carbon black by the incomplete combustion of a hydrocarbon feedstock caused by contacting the feedstock with the hot gas mixture; quenching the tail-gas; collecting the carbon black from the tail-gas to produce a tail-gas free of carbon black; drying the tail-gas; removing one or more of the combustible components from the dried tail-gas; and increasing the carbon black production rate by at least 19% by replacing from $33\frac{1}{3}\%$ to 100% of the fuel with the combustible components so removed.

One method of removing a combustible component (carbon monoxide) is by contacting the dried tail-gas with a liquid sorbent comprising cuprous aluminum halide; complexing substantially all of the carbon monoxide contained in the tail-gas; removing the complexed carbon monoxide from the tail-gas; contacting the complexed carbon monoxide with a stripping ligand that forms a more stable complex with sorbents than carbon monoxide, thereby exchanging the stripping ligand for carbon monoxide and recovering the carbon monoxide and a cuprous aluminum halide-stripping ligand containing complex. The contacting steps are conducted under substantially anhydrous conditions in the substantial absence of oxygen.

The effect of replacing the natural gas fuel with carbon monoxide and hydrogen is to produce a finer particle size, higher surface area carbon black. If the feedstock injection rate is increased to lower the surface area back to the original level, there is a significant increase in the rate of production and an increase in yield.

DESCRIPTION OF THE PREFERRED EMBODIMENTS

In a preferred embodiment of the present invention, air and a hydrocarbon fuel are burned to produce a hot gas mixture which produces a tail-gas containing carbon black by the incomplete combustion of a hydrocarbon feedstock. This tail-gas is quenched, the carbon black is collected from the tail-gas, and the tail-gas is dried. The tail-gas is contacted with a liquid sorbent comprising cuprous aluminum halide. Substantially all of the carbon monoxide contained in the tail-gas is complexed. The complexed carbon monoxide is removed from the tail-gas and is contacted with a stripping ligand that forms a more stable complex with sorbents than carbon monoxide, thereby exchanging the stripping ligand for carbon monoxide and recovering the carbon monoxide and a cuprous aluminum halide-stripping ligand containing complex. From $33\frac{1}{3}\%$ to 100% of the fuel is replaced with the carbon monoxide. The contacting steps are conducted under substantially anhydrous conditions in the substantial absence of oxygen.

In FIG. 1, air and natural gas are introduced into furnace 10 and are burned to produce a hot gas mixture. Oil feedstock is injected radially into furnace 10 a constant distance downstream of the point of air and gas introduction. A tail-gas containing carbon black is produced by the incomplete combustion of the feedstock by contacting the feedstock with the hot gas mixture. The tail-gas is quenched, the carbon black is removed by bag filters 20, and the tail-gas is dried in dryer 30. The dried tail-gas is contacted with cuprous aluminum chloride in a toluene base in a countercurrent absorber 40. Substantially all of the carbon monoxide contained in the tail-gas is complexed and is removed from the hydrogen and nitrogen, which are not soluble in toluene. The hydrogen is then separated from the nitrogen by a cryogenic process 70. Other compounds in the tail-gas that have a physical solubility in toluene are removed in flash unit 50. The complexed carbon monoxide is heated and passed to stripper 60 where it is contacted with ethylene, thereby exchanging the ethylene for carbon monoxide and recovering the carbon monoxide and a cuprous aluminum chloride-ethylene complex. Both contacting steps are conducted under substantially anhydrous conditions in the substantial absence of oxygen. The carbon monoxide and hydrogen are recycled to furnace 10 in increasing amounts and the natural gas flow is reduced until all of the natural gas is replaced with carbon monoxide and hydrogen.

When the non-combustible components are removed, the BTU content of the gas is raised from 45–50 BTU/scf (400–445 kcal/cu m) to about 320 BTU/scf (2850 kcal/cu m), permitting the manufacture of quality carbon black.

Liquid hydrocarbon fuels may be used instead of natural gas to start the process. Each BTU equivalent of these fuels would be replaced with from 0.85 to 1.3 BTU equivalents of carbon monoxide or hydrogen once sufficient carbon monoxide was generated.

The carbon monoxide can be stripped from the tail-gas by the process described in U.S. Pats. No. 3,592,865 and 3,651,159 which are herein incorporated by reference. The tail-gas is contacted with a liquid sorbent comprising cuprous aluminum halide. Substantially all of the carbon monoxide contained in the tail-gas is complexed. The complexed carbon monoxide is removed from the tail-gas and is contacted with a stripping ligand that forms a more stable complex with sorbents than carbon monoxide, thereby exchanging the stripping ligand for carbon monoxide and recovering the carbon monoxide and a cuprous aluminum halide-stripping ligand containing complex. The contacting steps are conducted under substantially anhydrous conditions in the substantial absence of oxygen. The carbon monoxide so stripped might also contain methane, acetylene and other similar hydrocarbons.

Hydrogen can also be stripped from the tail-gas and be used instead of, or in addition to, the use of carbon monoxide as a fuel. If hydrogen is used, 0.85 to 1.3 BTU equivalents of hydrogen is used for each BTU equivalent of natural gas (2.6–4.1 scf of $H_2$ per 1 scf of natural gas). One method of stripping the hydrogen from the tail-gas is by pasing the tail-gas through a toulene base. Hydrogen and nitrogen are insoluble in toulene, while the other components of the tail-gas are soluble in toulene. The hydrogen is then separated from the nitrogen by a cyrogenic process.

Best results occur when all of the natural gas is replaced by the carbon monoxide or other high BTU components of tail-gas, but the same increased production effects are seen to a lesser degree when less than 100% of the natural gas is replaced. The effect of replacing natural gas with carbon monoxide would be seen even when only 15% of the natural gas is so replaced.

When making ASTM designated N-375 blacks, not enough hydrogen would be generated to replace 100% of the natural gas. Alone, hydrogen could replace 62% of the natural gas. However these percentages will vary.

EXAMPLES

The invention will be further illustrated by the following examples which set forth particularly advantageous method and composition embodiments. While the examples are provided to illustrate the present invention, they are not intended to limit it.

All experimental work was performed with a furnace having a straight flow burner, but the results will be the same regardless of the general configuration of the burner. Oil was injected radially into the furnace through three ports downstream of the point of air and gas introduction. The furnace was brought to equilibrium at an air to gas ratio of 13.2:1 using natural gas, then the desired amount of carbon monoxide or hydrogen was added, followed by a reduction or cut-off as required of natural gas.

Natural gas burner fuel was replaced on a 3:1 volumetric basis (3 scf of carbon monoxide or hydrogen replacing 1 scf of natural gas) in order to approximately equate gross dry BTU content of replacement gas with that of the gas being replaced. Although the BTU value of carbon monoxide and hydrogen is approximately one-third that of 1000 BTU natural gas (methane), the stoichiometric flame temperatures of carbon monoxide and hydrogen are appreciably higher. Following are BTU and flame temperature data for those gases:

| Gas | Gross BTU/scf | (kcal/cu m) | Flame Temp,°C. |
|---|---|---|---|
| Methane | 1009.7 | (8986) | 1875 |
| Carbon Monoxide | 321.0 | (2857) | 2100 |
| Hydrogen | 324.0 | (2883) | 2045 |

The higher flame temperatures of the carbon monoxide and hydrogen may account for the higher production rates accompanying their use as burner fuels.

Compressed, dry, 99.5% purity carbon monoxide and hydrogen were used to simulate the recycling of carbon monoxide and hydrogen from its separated system. The carbon monoxide or hydrogen was metered into the natural gas line immediately upstream of mixing venturi in the same line and at the same line pressure as the natural gas (30 psig or 3.14 kg/sq. cm).

Variables common to all runs were burner air 120 scfm (3.40 cu m/min) at a pressure of 20 psig (2.44 kg/sq. cm); jacket air 2.5 scfm (0.071 cu m/min); feedstock preheated to 260° C.; quench temperature 650° C.±15° C. All operation variables were adjusted prior to each run and the furnace allowed to equilibrate. Run durations were 30 minutes.

Inlet and tail-gas samples were taken during the first and last half of each carbon monoxide and hydrogen run. Only ASTM designation N-375 black was produced and each sample was subjected to identical steps of bag filter collection, wet pinmixing and roller drying at 177° C. The usual chemical and rubber tests were performed and yield determinations were made by two ways: a theoretical yield was calculated from the difference between the amount of carbon introduced into the furnace and the amount which left the furnace in tail-gases as determined by gas chromatography, and measured yield was calculated from the amount of carbon introduced into the furnace and the pounds of carbon black made.

DBP absorption is determined in accordance with the procedure set forth in ASTM D-2414. Iodine Adsorption No is determined in accordance with the procedure set forth in ASTM D-1510. Tinting Strength is determined in accordance with the procedure set forth in ASTM D-3265.

CONTROL EXAMPLE A

In the control example, 9.05 scfm (0.26 cu m/min) of natural gas was injected into the carbon black furnace at a temperature of 60° F. (16° C.). The air inlet temperature was 41° F. (5° C.) and the bag filter inlet temperature was 390° F. (199° C.). In the tail-gas there was 12.2 scfm (0.345 cu m/min) of carbon monoxide. The tail-gas contained 9.29% carbon monoxide, 8.68% hydrogen, 0.31% methane, 73.09% nitrogen, and 7.24% carbon dioxide. The combustible components constituted less than 20% of the tail-gas. The resulting product had a DBP No. of 118 cc/g; an Iodine No. of 92 sq. m/g; and a tinting strength of 118.

EXAMPLE I 6.0 scfm (0.17 cu m/min) of natural gas and 9.0 scfm (0.255 cu m/min) of carbon monoxide was injected into the carbon black furnace at a temperature of 70° F. (21° C.). The air inlet temperature was 68° F. (20° C.) and the bag filter inlet temperature was 450° F. (232° C.). In the tail-gas there was 16.2 scfm (0.46 cu m/min) of carbon monoxide. The tail-gas contained 11.67% carbon monoxide, 8.04% hydrogen, 0.29% methane, 69.38% nitrogen, and 9.16% carbon dioxide. The resulting product had a DBP No. of 116 cc/g; an Iodine No. of 96 sq. m/g; and a tinting strength of 117. There was a 26% increase in production rate over Example A.

EXAMPLE II 3.0 scfm (0.085 cu m/min) of natural gas and 18.0 scfm (0.51 cu m/min) of carbon monoxide was injected into the carbon black furnace at a temperature of 87° F. (31° C.). The air inlet temperature was 84° F. (29° C.) and the bag filter inlet temperature was 420° F. (216° C.). In the tail-gas there was 20.4 scfm (0.58 cu m/min) of carbon monoxide. The tail-gas contained 14.06% carbon monoxide, 7.10% hydrogen, 0.27% methane, 66.02% nitrogen, and 11.11% carbon dioxide. The resulting product had a DBP No. of 115 cc/g; an Iodine No. of 94 sq. m/g; and a tinting strength of 115. There was a 40% increase in production rate over Example A.

EXAMPLE III 6.0 scfm (0.17 cu m/min) of natural gas and 9.0 scfm (0.255 cu m/min) of hydrogen was injected into the carbon black furnace at a temperature of 70° F. (21° C.). The air inlet temperature was 64° F. (18° C.) and the bag filter inlet temperature was 450° F. (232° C.). In the tail-gas there was 14.8 scfm (0.42 cu m/min) of hydrogen. The tail-gas contained 9.19% carbon monoxide, 11.12% hydrogen, 0.41% methane, 72.14% nitrogen, and 5.66% carbon dioxide. The resulting product had a DBP No. of 116 cc/g; an Iodine No. of 95 sq. m/g; and a tinting strength of 117. There was a 21% increase in production rate over Example A.

EXAMPLE IV 3.0 scfm (0.085 cu m/min) of natural gas and 18.0 scfm (0.51 cu m/min) of hydrogen was injected into the carbon black furnace at a temperature of 77° F. (25° C.). The air inlet temperature was 78° F. (26° C.) and the bag filter inlet temperature was 460° F. (238° C.). In the tail-gas there was 17.1 scfm (0.48 cu m/min) of hydrogen. The tail-gas contained 9.10% carbon monoxide, 12.71% hydrogen, 0.46% methane, 71.17% nitrogen, and 5.10% carbon dioxide. The resulting product had a DBP No. of 120 cc/g; an Iodine No. of 93 sq. m/g; and a tinting strength of 117. There was a 29% increase in production rate over Example A.

EXAMPLE V 27.0 scfm (0.765 cu m/min) of hydrogen was injected into the carbon black furnace at a temperature of 68° F. (20° C.). The air inlet temperature was 55° F. (13° C.) and the bag filter inlet temperature was 300° F. (149° C.). In the tail-gas there was 18.7 scfm (0.53 cu m/min) of hydrogen. The tail-gas contained 9.47% carbon monoxide, 13.80% hydrogen, 0.47% methane, 70.53% nitrogen, and 4.34% carbon dioxide. The resulting product had a DBP No. of 119 cc/g; an Iodine No. of 92 sq. m/g; and a tinting strength of 115. There was a 19% increase in production rate over Example A.

EXAMPLE VI 27.0 scfm (0.765 cu m/min) of carbon monoxide is injected into the carbon black furnace at a temperature of 111° F. (44° C.). The air inlet temperature is 89° F. (32° C.) and the bag filter inlet temperature is 300° F. (149° C.). In the tail-gas there is expected to be 27.5 scfm (0.78 cu m/min) of carbon monoxide. A 42% increase in production rate over Example A is expected.

EXAMPLE VII 22.5 scfm (0.64 cu m/min) of carbon monoxide and 4.5 scfm (0.13 cu m/min) of hydrogen is injected into the carbon black furnace at a temperature of 103° F. (39° C.). The air inlet temperature is 83° F. (28° C.) and the bag filter inlet temperature is 300° F. (149° C.). In the tail-gas there is expected to be 25.1 scfm (0.71 cu m/min) of carbon monoxide and 10.5 scfm (0.30 cu m/min) of hydrogen. A 42% increase in production rate over Example A is expected.

EXAMPLE VIII 18.0 scfm (0.51 cu m/min) of carbon monoxide and 9.0 scfm (0.255 cu m/min) of hydrogen is injected into the carbon black furnace at a temperature of 96° F. (36° C.). The air inlet temperature is 77° F. (25° C.) and the bag filter inlet temperature is 300° F. (149° C.). In the tail-gas there is expected to be 22.6 scfm (0.64 cu m/min) of carbon monoxide and 12.1 scfm (0.34 cu m/min) of hydrogen. A 41% increase in production rate over Example A is expected.

EXAMPLE IX 13.5 scfm (0.38 cu m/min) of carbon monoxide and 13.5 scfm (0.38 cu m/min) of hydrogen is injected into the carbon black furnace at a temperature of 89° F. (32° C.). The air inlet temperature is 72° F. (22° C.) and the bag filter inlet temperature is 300° F. (149° C.). In the tail-gas there is expected to be 20.2 scfm (0.57 cu m/min) of carbon monoxide and 13.8 scfm (0.39 cu m/min) of hydrogen. A 40% increase in production rate over Example A is expected.

EXAMPLE X 120 scfm (3.40 cubic meters/min) of air and 9.05 scfm (0.26 cubic meters/min) of natural gas are introduced into a furnace and are burned to produce a hot gas mixture. The air inlet temperature is 72° F. (22° C.) and the gas inlet temperature is 90° F. (32° C.). Oil feedstock preheated to 260° C. is injected radially into the furnace at three points a constant distance downstream of the point of air and gas introduction. A tail-gas containing carbon black is produced by the incomplete combustion of the feedstock by contacting the feedstock with the hot gas mixture. The tail-gas is quenched at 650° C., the carbon black is removed, and the tail-gas is dried. The dried tail-gas is contacted with cuprous aluminum chloride in a toluene base in a counter current absorber at ambient temperature. Substantially all of the carbon monoxide contained in the tail-gas is complexed and removed from the hydrogen and nitrogen, which are not soluble in toulene. The hydrogen is then separated from the nitrogen by a cryogenic process. Other common compounds in the tail-gas that have a physical solubility in the toluene base (such as carbon dioxide) are removed in a flash unit. The complexed carbon monoxide is heated and passed to a stripper where it is contacted with ethylene, thereby exchanging the ethylene for carbon monoxide and recovering the carbon monoxide and a cuprous aluminum chloride-ethylene containing complex. Both contacting steps are conducted under substantially anhydrous conditions in the substantial absence of oxygen (less than 0.1%). The carbon monoxide and hydrogen are recycled to the burner in increasing amounts and the natural gas flow is reduced until all of the natural gas has been replaced with 14 scfm (0.40 cubic meters/min) of carbon monoxide and 13 scfm (0.37 cubic meters/min) of hydrogen. In the tail-gas there is expected to be 20.5 scfm (0.58 cubic meters/min) of carbon monoxide and 13.6 scfm (0.38 cubic meters/min) of hydrogen. A 40% increase in production rate over Example A is expected.

Furnace operation was not adversely affected by substituting carbon monoxide or hydrogen for natural gas burner fuel. The flame and injected oil pattern were observed through the air and gas inlet along the furnace axis by means of an axial viewing port. No difference in internal combustion patterns were observed upon changeover.

TABLE

| Example | Theoretical Yield lb/gal | Measured Yield lb/gal | Production Rate lb/hr | DBP | I2 | Tint | CO or H$_2$ Metered/ Generated in tail-gas |
|---|---|---|---|---|---|---|---|
| A | 4.267 | 4.351 | 30.5 | 118 | 92 | 118 | 0.0 |
| I | 4.471 | 4.416 | 38.4 | 116 | 96 | 117 | 0.56 |
| II | 4.512 | 4.440 | 42.6 | 115 | 94 | 115 | 0.88 |
| III | 4.411 | 4.308 | 37.0 | 116 | 95 | 117 | 0.61 |
| IV | 4.229 | 4.268 | 39.4 | 120 | 93 | 117 | 1.05 |
| V | 4.186 | 4.081 | 36.4 | 119 | 92 | 115 | 1.44 |

Yield increased when the natural gas was replaced with carbon monoxide. The added carbon input inherent with carbon monoxide helps drive the reaction equilibrium toward the free carbon side.

Yield decreased when the natural gas was replaced with hydrogen. Hydrogen lacks any associated carbon to add to the reaction; even so, the yield was well within the accepted levels.

Figure 2:
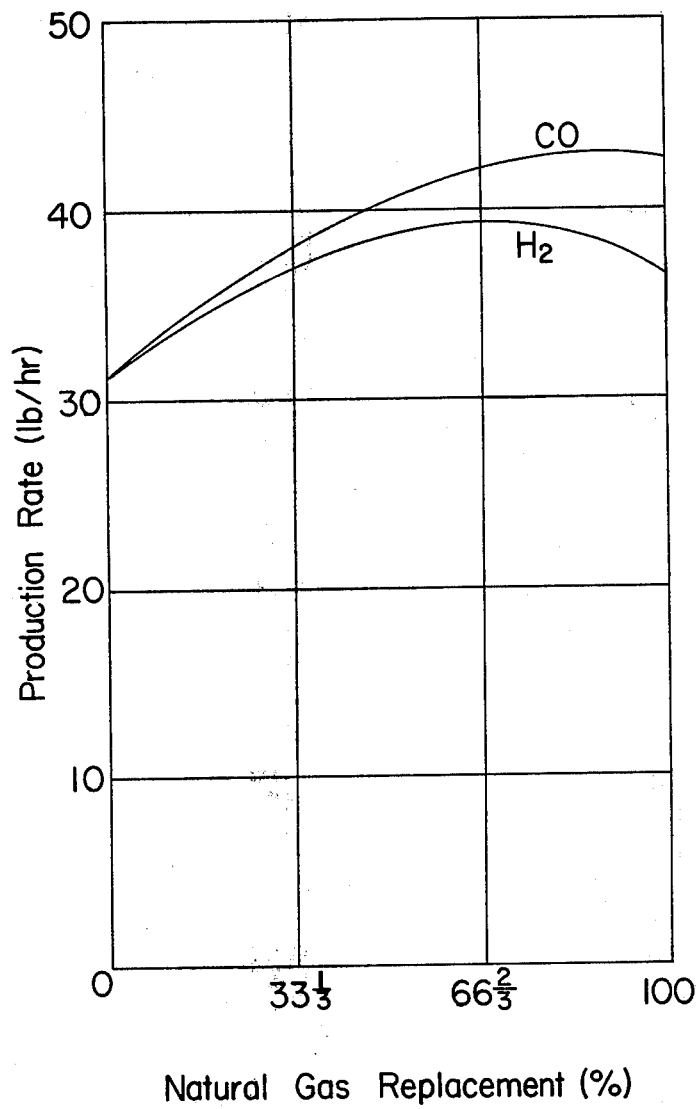
FIG. 2 shows a plot of carbon black production rate versus natural gas replacement with carbon monoxide and with hydrogen.

The production rate increased in all runs where natural gas was replaced with carbon monoxide or hydrogen. FIG. 2 shows a plot of carbon black production rate versus natural gas replacement. For carbon monoxide replacement, the production rate increased 26 to 40%. Extrapolation of the carbon monoxide data to 100% replacement gives a projected production rate increase of 42%. For hydrogen replacement, the production rate increased 19 to 29%.

Thus, in operation, air and a hydrocarbon fuel are burned to produce a hot gas mixture which produces a tail-gas containing carbon black by the incomplete combustion of a hydrocarbon feedstock. The tail-gas is quenched, dried, and the carbon black is collected from the tail-gas. The combustible components are removed from the dried tail-gas, and from 33⅓% to 100% of the fuel is replaced with the combustible components to increase the carbon black production rate by at least 19%.

While the present invention has been described with reference to specific embodiments, this application is intended to cover those various changes and substitutions which may be made by those skilled in the art without departing from the spirit and scope of the appended claims.

We claim:

1. A process for the production of carbon black from a hydrocarbon feedstock comprising:
   (a) burning a hydrocarbon fuel with air in an insufficient amount to support complete combustion to produce a hot gas mixture;
   (b) producing a tail-gas containing carbon black by the incomplete combustion of said hydrocarbon feedstock caused by contacting said feedstock with said hot gas mixture;
   (c) quenching said tail-gas;
   (d) collecting the carbon black from said tail-gas;
   (e) drying said tail-gas;
   (f) removing carbon monoxide from said dried tail-gas; and
   (g) increasing the carbon black production rate by at least 26% by replacing from 33⅓% to 100% of said fuel in step (a) with said carbon monoxide.

2. A process according to claim 1 wherein each BTU equivalent of said replaced fuel is replaced with from 0.85 to 1.3 BTU equivalent of said carbon monoxide.

3. A process according to claim 1 wherein from 50% to 100% of the fuel is replaced with said carbon monoxide.

4. A process according to claim 1 wherein all of the fuel is replaced with said carbon monoxide.

5. A process for the production of carbon black from a hydrocarbon feedstock comprising:
   (a) burning a hydrocarbon fuel with air in an insufficient amount to support complete combustion to produce a hot gas mixture;
   (b) producing a tail-gas containing carbon black by the incomplete combustion of said hydrocarbon feedstock caused by contacting said feedstock with said hot gas mixture;
   (c) quenching said tail-gas;
   (d) drying said tail-gas;
   (e) collecting the carbon black from said dried tail-gas;
   (f) removing hydrogen from said dried tail-gas; and
   (g) increasing the carbon black production rate by at least 19% by replacing from 33⅓% to 100% of said fuel in step (a) with said hydrogen.

6. A process according to claim 5 wherein each BTU equivalent of said replaced fuel is replaced with from 0.85 to 1.3 BTU equivalent of said hydrogen.

7. A process according to claim 5 wherein from 50% to 62% of the fuel is replaced with said hydrogen.

8. A process for the production of carbon black from a hydrocarbon feedstock comprising:
   (a) burning a hydrocarbon fuel with air in an insufficient amount to support complete combustion to produce a hot gas mixture;
   (b) producing a tail-gas containing carbon black by the incomplete combustion of said hydrocarbon feedstock caused by contacting said feedstock with said hot gas mixture;
   (c) quenching said tail-gas;
   (d) collecting the carbon black from said tail-gas;
   (e) drying said tail-gas;
   (f) contacting the dried tail-gas with a liquid sorbent comprising cuprous aluminum halide;
   (g) complexing substantially all of the carbon monoxide contained in the tail-gas;
   (h) removing the complexed carbon monoxide from the tail-gas;
   (i) contacting the complexed carbon monoxide with a stripping ligand that forms a more stable complex with sorbents than carbon monoxide, thereby exchanging the stripping ligand for carbon monoxide and recovering the carbon monoxide and a cuprous aluminum halide-stripping ligand containing complex, said contacting steps conducted under substantially anhydrous conditions in the substantial absence of oxygen; and
   (j) increasing the carbon black production rate by at least 26% by replacing from 33⅓% to 100% of said fuel in step (a) with said carbon monoxide.

9. A process according to claim 8 wherein each BTU equivalent of said replaced fuel is replaced with from 0.85 to 1.3 BTU equivalent of said carbon monoxide.

10. A process according to claim 8 wherein from 50% to 100% of the fuel is replaced with said carbon monoxide.

11. A process according to claim 8 wherein all of the fuel is replaced with said carbon monoxide.

12. A process for the production of carbon black from a hydrocarbon feedstock comprising:
   (a) burning a hydrocarbon fuel with air in an insufficient amount to support complete combustion to produce a hot gas mixture;
   (b) producing a tail-gas containing carbon black by the incomplete combustion of said hydrocarbon feedstock caused by contacting said feedstock with said hot gas mixture;
   (c) quenching said tail-gas;
   (d) collecting the carbon black from said tail-gas;
   (e) drying said tail-gas;
   (f) contacting the dried tail-gas with cuprous aluminum cloride in a toluene base;
   (g) complexing substantially all of the carbon monoxide contained in the tail-gas;
   (h) removing the complexed carbon monoxide from the tail-gas;
   (i) contacting the complexed carbon monoxide with a stripping ligand that forms a more stable complex with sorbents than carbon monoxide, thereby exchanging the stripping ligand for carbon monoxide and recovering the carbon monoxide and a cuprous aluminum chloride-stripping ligand containing complex, said contacting steps conducted under substantially anhydrous conditions in the substantial absence of oxygen;

(j) removing hydrogen from said dried tail-gas; and
(k) increasing the carbon black production rate by at least 22% by replacing from 33⅓% to 100% of said fuel in step (a) with said carbon monoxide and hydrogen.

* * * * *